Aug. 10, 1965   J. H. KRENZ   3,199,922
HUB AND SPOKE CONSTRUCTION FOR WIRE WHEELS
Filed May 8, 1964
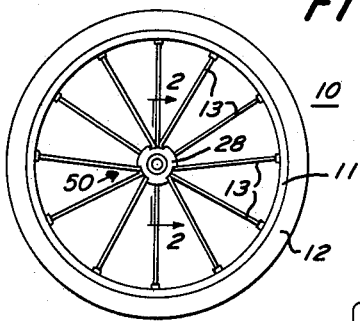
FIG.1
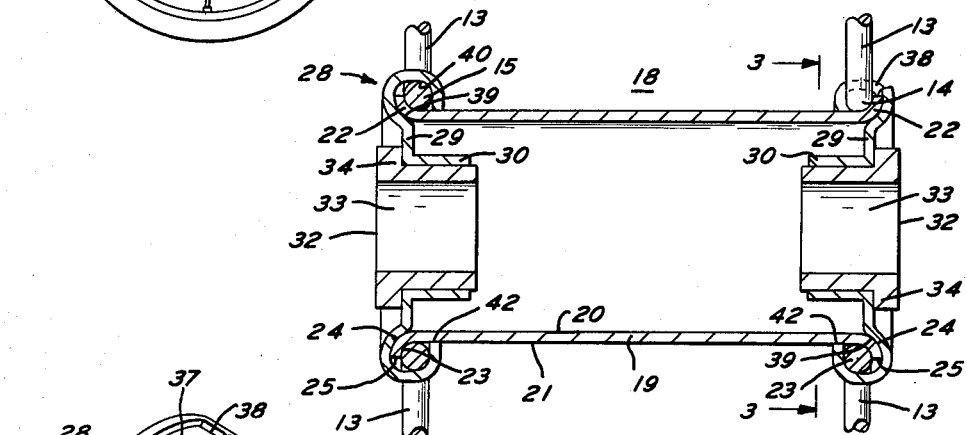
FIG.2
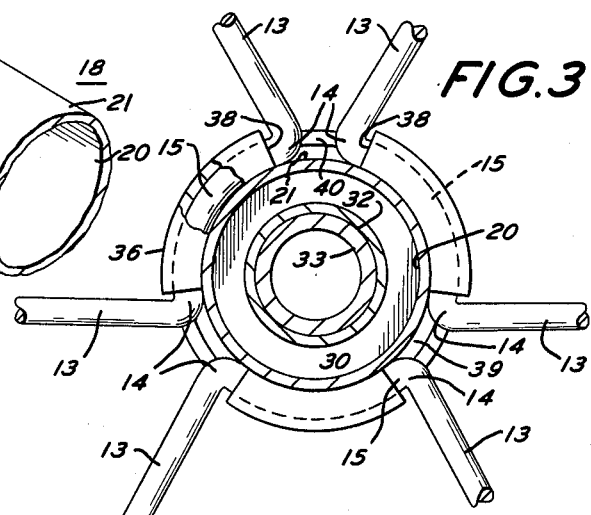
FIG.4
FIG.3
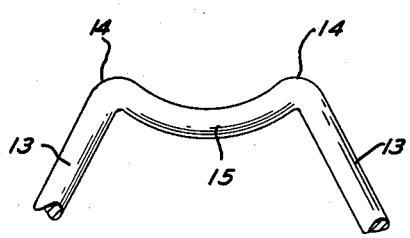
FIG.5
INVENTOR
JOSEPH H. KRENZ
BY B.T.Wolbensmith
ATTORNEY

United States Patent Office 3,199,922
Patented Aug. 10, 1965

3,199,922
HUB AND SPOKE CONSTRUCTION
FOR WIRE WHEELS
Joseph H. Krenz, % Krenz Wheel Manufacturing,
110 Harbor Lane, Somers Point, N.J.
Filed May 8, 1964, Ser. No. 366,018
7 Claims. (Cl. 301—59)

This invention relates to hub and spoke construction for wire wheels.

Various mountings for the inner ends of the spokes in wire wheels have heretofore been proposed. In one common type of construction inner and outer discs or plates have been employed, the discs being held together by rivets with the inner V-shaped ends of spokes secured therebetween, and the assembly being carried on a hub. In another common type of construction the outer discs or flanges are looped around the spokes, and extend outwardly independent of the hub sleeve. This hub assembly has inadequate strength and is costly due to the excess material required.

The construction and assembly of the spoke mountings heretofore available have been costly, time consuming and troublesome.

It is the principal object of the present invention to provide a hub and spoke construction for wire wheels which is sturdy, simple in construction and free from difficulties in use.

It is a further object of the present invention to provide a hub and spoke construction for wire wheels which utilizes one component formed as a metal stamping within which the inner ends of the spokes are assembled and which receives an end of a cylindrical hub sleeve and has surface portions which aid in shaping the hub sleeve to holding position.

It is a further object of the present invention to provide a hub and spoke construction having a hub sleeve which is in an improved gripping relation to a hub flange and the inner ends of wire spokes.

It is a further object of the present invention to provide a hub and spoke construction having a hub sleeve and hub flange in an improved interengaging relation with the inner portions of the spokes securely gripped and held.

Other objects and advantageous features of the invention will be apparent from the description and claims.

The nature and characteristic features of the invention will be more readily understood from the following description taken in connection with the accompanying drawings forming part thereof, in which:

FIGURE 1 is a side elevational view of a wheel having the hub and spoke construction of the invention applied thereto;

FIG. 2 is a sectional view, enlarged, taken approximately on the line 2—2 of FIG. 1;

FIG. 3 is a sectional view taken approximately on the line 3—3 of FIG. 2;

FIG. 4 is an exploded perspective view, prior to assembly of the hub flange and hub sleeve; and FIG. 5 is a fragmentary inner end view of the connection of two of the spokes.

It should, of course, be understood that the description and drawings herein are illustrated merely, and that various modifications and changes can be made in the structure disclosed without departing from the spirit of the invention.

Like numerals refer to like parts throughout the several views.

Referring now more particularly to the drawings, a wheel 10 is shown generally in FIG. 1 having a rim 11, a tire 12 on the rim, and wire spokes 13 extending from a hub 50 to the rim 11. The outer ends of the spokes 13 can be secured to the rim 11 in any desired manner.

Referring now more particularly to FIGS. 2, 3 and 5, the spokes 13 are prefereably of round wire, extend radially and have bends 14 joining each pair to central arcuate spoke connectors 15, the radius of curvature of the connectors 15 being of a predetermined value.

A hub sleeve 18 is provided having a central cylindrical portion 19 with an inner surface 20 and an outer surface 21. The sleeve 18 has outturned or flared ends 22 bounded by inner surved surfaces 23 with a radius of curvature equal to the radius of the wire of the connectors 15, with outer curved surfaces 24 determined by the thickness of the material of the hub sleeve 18 and the inner curved surface 23, and bounded by end terminal faces 25.

At each end of the hub sleeve 18 a hub flange 28 is provided having a radially extending flat plate portion 29 with a cylindrical collar 30 extending therefrom inwardly within the sleeve 18. While any desired type of antifriction bearing may be mounted in and at the collar 30 a bushing 32 is shown by way of illustration. The bushing 32 is preferably of nylon, with a central shaft opening 33 and with a rim 34 to engage against the outer face of the plate portion 29.

The hub flange 28, outwardly of the plate portion 29, has a curved rim 36, hook or C-shaped in cross section as seen particularly in FIGS. 2 and 4. The rim 36 has circumferentially spaced cut-outs 37 for the reception of the spokes 13 with the bends 14 spaced from the end faces 38 of the cut-outs 37.

The flange rim 36 has a conclave inner face 39 commencing inwardly of the radial location of the inner surface 19 of the hub sleeve 18, and with a radius of curvature approximately equal to the sum of the radii of the wire of the spoke connectors 15 and the thickness of the material of the hub sleeve 18. The inner face 39 has an inner curved face 40 extending therefrom partially over the spoke connector 15 and inwardly to the hub sleeve 18 and preferably with an end terminal face 42 engaging the outer surface 21 of the hub sleeve 18.

With a hub flange 28 at each end of the hub sleeve 18, the spoke connectors 15 at one end are prerferably in staggered relation to the connectors 15 at the other end.

The flaring of the ends 22 of the hub sleeve 18 is preferably accomplished at the time of assembly of the sleeve 18, spokes 13 and hub flanges 28.

The ends of the sleeve 18 are initially straight, as illustrated in FIG. 4. For assembly the spokes 13 for each end are inserted within the hub flanges 28 with the connectors 15 nested within the rims 36 and the ends of the sleeve 18 are advanced to the faces 39 and forced thereagainst. The faces 39 provide die surfaces to flare the ends 22 which are advanced so that the end faces 25 make about one quarter turn and are located as shown in FIGS. 2 and 3.

It will thus be seen that a structure has been provided for attaining the objects of the invention.

I claim:

1. A wheel hub construction comprising a hub sleeve having a cylindrical portion with inner and outer surfaces and an outwardly flared end, a hub flange at the end of the sleeve having a plate portion extending radially inwardly of said sleeve and having outwardly of said plate portion a rim, a spoke having a radial portion and a circumferential portion extending partially around said sleeve and in engagement therewith, said hub flange having an inner surface with which said flared end is in engagement, said flange rim extending around the circumferential spoke portion in engagement therewith and having a terminal face in facing relation to said outer surface of said hub sleeve.

2. A wheel hub construction as defined in claim 1 in which said inner hub surface of said flange is concave.

3. A wheel hub construction as defined in claim 1 in which said terminal face is in engagement with the outer surface of said hub sleeve.

4. A wheel hub construction as defined in claim 1 in which said spoke is of round wire, said inner surface of said hub flange is conclave, and said flared end of said hub sleeve is in simultaneous engagement with said circumferential portion of said spoke and with said inner concave surface.

5. A wheel hub construction as defined in claim 1 in which said flared end is extended around the circumferential spoke portion of the order of one quarter of a turn.

6. A wheel hub construction as defined in claim 1 in which the inner ends of spokes at one end of said hub sleeve are circumferentially offset with respect to the inner ends of the spokes at the opposite end.

7. A wheel hub construction as defined in claim 1 in which said hub flange provides a die surface for said sleeve.

References Cited by the Examiner

UNITED STATES PATENTS

| | | | |
|---|---|---|---|
| 719,281 | 1/03 | Wagner | 301—59 |
| 928,413 | 7/09 | Watters | 301—57 |

FOREIGN PATENTS

| | | |
|---|---|---|
| 753,869 | 8/56 | Great Britain. |

BENJAMIN HERSH, *Primary Examiner.*

ARTHUR L. LA POINT, *Examiner.*